United States Patent
Otsuki

Patent Number: 5,283,779
Date of Patent: Feb. 1, 1994

[54] REWRITABLE OPTICAL DISC

[75] Inventor: Tadashi Otsuki, Kanagawa, Japan

[73] Assignee: Sony Corporation, Tokyo, Japan

[21] Appl. No.: 893,587

[22] Filed: Jun. 2, 1992

Related U.S. Application Data

[63] Continuation of Ser. No. 686,024, Apr. 16, 1991, abandoned.

[30] Foreign Application Priority Data

Apr. 20, 1990 [JP] Japan ............... 2-104515

[51] Int. Cl.⁵ .............................. G11B 3/90
[52] U.S. Cl. ............................ 369/275.2; 369/53
[58] Field of Search ........... 369/47, 48, 275.1, 275.2, 369/275.3, 54, 58, 44.32, 44.33, 53, 57

[56] References Cited

U.S. PATENT DOCUMENTS

| | | | |
|---|---|---|---|
| 4,535,439 | 8/1985 | Satoh et al. | 369/275.3 |
| 4,611,314 | 9/1986 | Ogata | 369/48 |
| 4,733,386 | 3/1988 | Shimoi | 369/47 |
| 4,768,181 | 8/1988 | Ichinose et al. | 369/54 |
| 4,774,700 | 9/1988 | Satoh et al. | 369/58 |
| 4,862,439 | 8/1989 | Ando et al. | 369/56 |
| 4,910,725 | 3/1990 | Drexler | 369/47 |
| 4,932,014 | 6/1990 | Tamiya | 369/48 |
| 4,937,804 | 6/1990 | Ishihara | 369/48 |
| 4,980,878 | 12/1990 | Szerlip | 369/58 |

FOREIGN PATENT DOCUMENTS

| | | | |
|---|---|---|---|
| 0216704 | 4/1987 | European Pat. Off. | 369/47 |
| 0216704A2 | 4/1987 | European Pat. Off. | |
| 0328240A2 | 8/1989 | European Pat. Off. | |
| 3611561A1 | 10/1986 | Fed. Rep. of Germany | |
| 3734638A1 | 4/1988 | Fed. Rep. of Germany | |
| 3741404AS1 | 6/1988 | Fed. Rep. of Germany | |
| 0041444 | 3/1983 | Japan | 369/47 |

Primary Examiner—Eugene R. LaRoche
Assistant Examiner—Tan Nguyen
Attorney, Agent, or Firm—Limbach & Limbach

[57] ABSTRACT

A rewritable optical disk has a user recording area in which data is stored in a plurality of sectors, and a written sector flag zone radially separated from the user recording area. The written sector flag includes a plurality of written sector flags, each flag corresponding to one sector in the user recording area. Each written sector flag indicates by its setting whether or not information data has been written in its corresponding sector in the user recording area. The written sector flags are single bits, and are written using error correction. The written sector flags are written in sectors in the written sector flag zone. If a sector is determined to be "no good" and cannot be used for writing written sector flags, the written sector flags that would be written in the "no good" sector are written in the next good sector following the "no good" sector. An apparatus for writing and reading an optical disk with a written sector flag zone reads the written sector flags in the written sector flag zone. A write inhibitor, responsive to the read written sector flags, inhibits writing in a sector indicated as having data written in it. The apparatus is responsive to the write inhibitor and writes information data on the disk in a sector in which writing is not inhibited. The apparatus then writes the written sector flag corresponding to the sector to indicate that information data has been written in the sector.

10 Claims, 3 Drawing Sheets

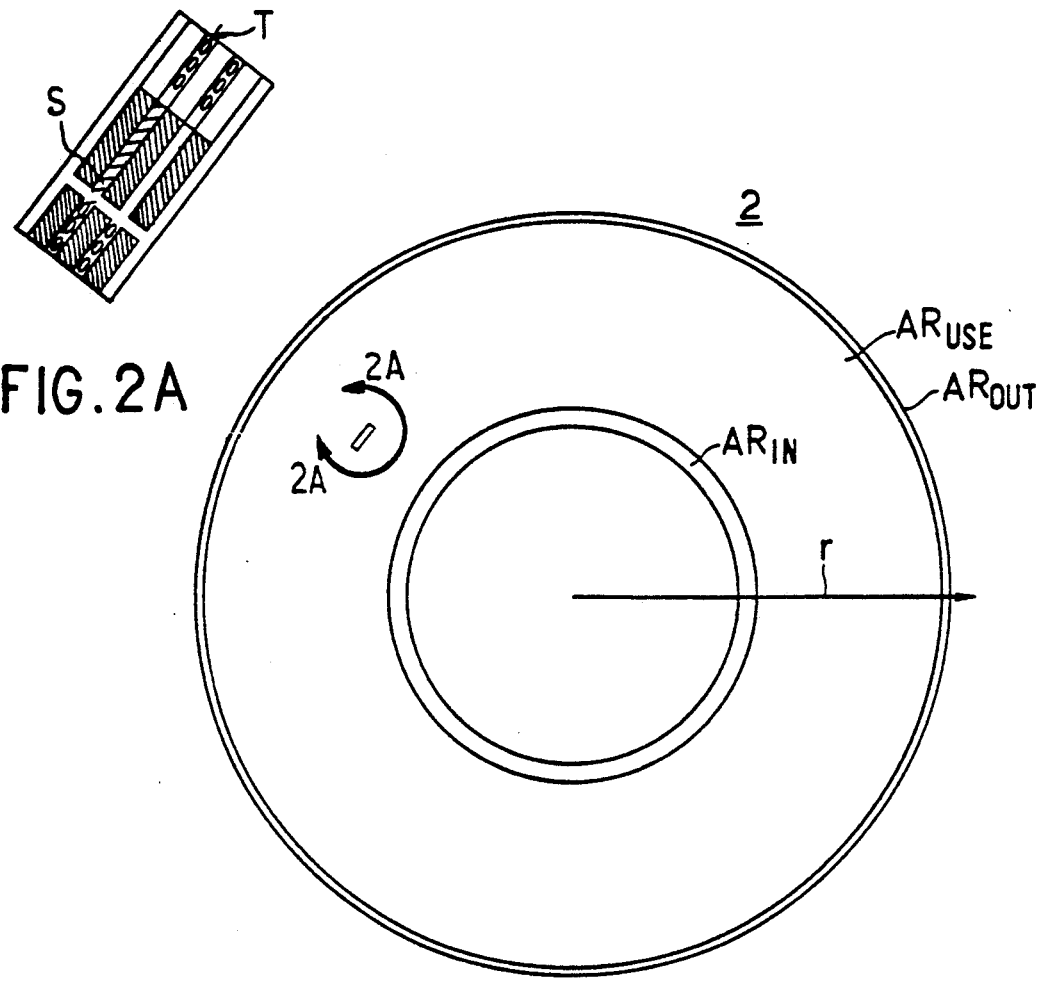
FIG.2A
FIG.2
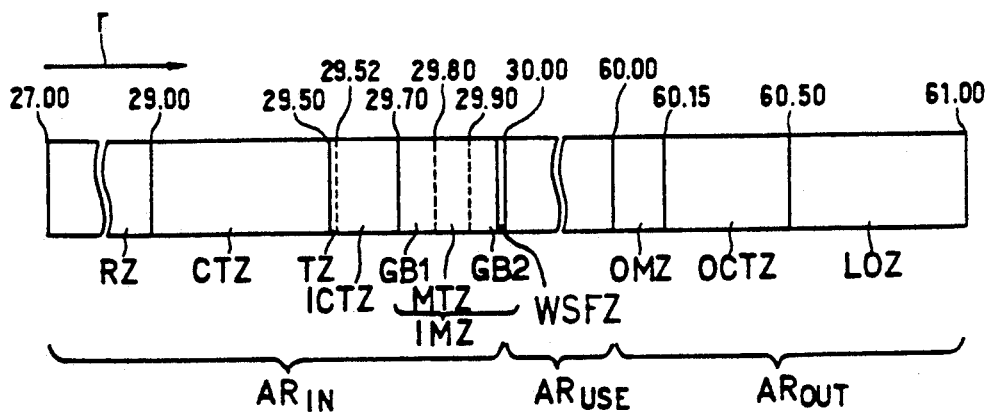
FIG.3

REWRITABLE OPTICAL DISC

This is a continuation of co-pending application Ser. No. 07/686,024 filed on Apr. 16, 1991 now abandoned.

BACKGROUND OF THE INVENTION

The present invention relates to an optical disk, and more particularly preferably relates to a magneto-optical disk used as a postscript-type optical disk.

The prior art optical disk includes an optical disk (or postscript-type optical disk (WORM disk)) capable of writing predetermined information data once only, and a rewritable optical disk (or magneto-optical disk (MO disk)) capable of writing information data over and over again.

The WORM disk and the MO disk have different recording and reproducing principles and recording medium structures. Hence, a recording and reproducing apparatus that is capable of using both types of disk must use a recording laser with selectable power optimized for characteristics of each recording medium. Such an apparatus must also have a selectable reproducing equalizer characteristic.

WORM disks can use various types of recording media recording such as perforated disk, phase change disk, alloy type disk, and the like. Hence, to be able to record and reproduce any disk, the recording laser power and the reproducing equalizer characteristic of the recording and reproducing apparatus must be adjusted for the particular species of WORM disk used. Consequently, the construction of the recording and reproducing apparatus is complicated.

The ability of the WORM disk to write data only once is regarded by some as preventing tampering with the recorded data.

In practice, however, when writing information data, if a sector, which will be called an N.G. sector, with a write/read error is detected in the user recording area, a so-called alternation process is carried out. In the alternation process, information data that would otherwise be written in the N.G. sector is written in another sector instead of the N.G. sector. Consequently, the information data is, in effect, tampered with simply and undetectably. Therefore, the WORM disk can be regarded as being equivalent to the rewritable MO disk.

Further in WORM disk, flag information and other information for indicating whether or not certain sectors of the user recording area are unused or whether or not an alternation process has been carried out are written in each sector.

This means that, in a WORM disk, when searching for an empty sector by detecting whether or not certain sectors of the user recording area are unused, the flag information in each sector must be read. Also, error detection and correction must be applied to the content of the sector. The search process consequently requires considerable time.

If a certain sector of the user recording area is determined to be an N.G. sector, and an alternation process is carried out, the flag information read out for determining whether or not the sector is unused becomes uncertain. To restore certainty, the information data in the sector must be read out and error detection and correction applied. This is also unsatisfactory with respect to the time required for the process and its precision.

To solve such problems in detecting whether or not a predetermined sector of the user recording area is unused, and thus preventing overwriting a used sector, an MO disk, which is regarded as equivalent to a WORM disk may be used as a postscript-type optical disk.

SUMMARY OF THE INVENTION

In view of the foregoing, an object of this n is to provide an optical disk in which an optical disk having a rewritable user data may be used as a postscript-type optical disk.

Another object of the invention is to provide an optical disk which is capable of detecting easily and accurately whether or not each sector of the user recording area has been used.

The foregoing objects and other objects of the invention have been achieved by providing an optical disk 2 in which information data is writable to or readable from sectors in a user recording area $AR_{USE}$, and which has a written sector flag zone WSFZ radially separated from the user recording area in which zone there are a plurality of written sector flags indicating whether or not each sector of the user recording area $AR_{USE}$ has been used.

Also in the optical disk 2, a no-good (N.G.) sector $SEC_{NG}$, in the written sector flag zone WSFZ is invalidated by carrying out an alternation process, and forming the written sector flag zone WSFZ in the sectors following the N.G. sector $SEC_{NG}$.

The written sector flag zone WSFZ, in which there are a plurality of written sector flags indicating whether or not each sector of the user recording area $AR_{USE}$ has been used, enables easy determination of whether or not each sector of the user recording area $AR_{USE}$ has been used.

Further, an alternation process is carried out on the written sector flag zone WSFZ, which detects with certainty whether or not each sector of the user recording area $AR_{USE}$ has been used.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 2 is a schematic diagram showing the format of the optical disk of the embodiment.

FIG. 2A is an enlargement of the portion marked 2A of the optical disk shown in FIG. 2 showing tracks and sectors.

FIG. 3 is a schematic diagram showing the format of the optical disk of the embodiment.

DETAILED DESCRIPTION OF THE INVENTION

Figure 1:
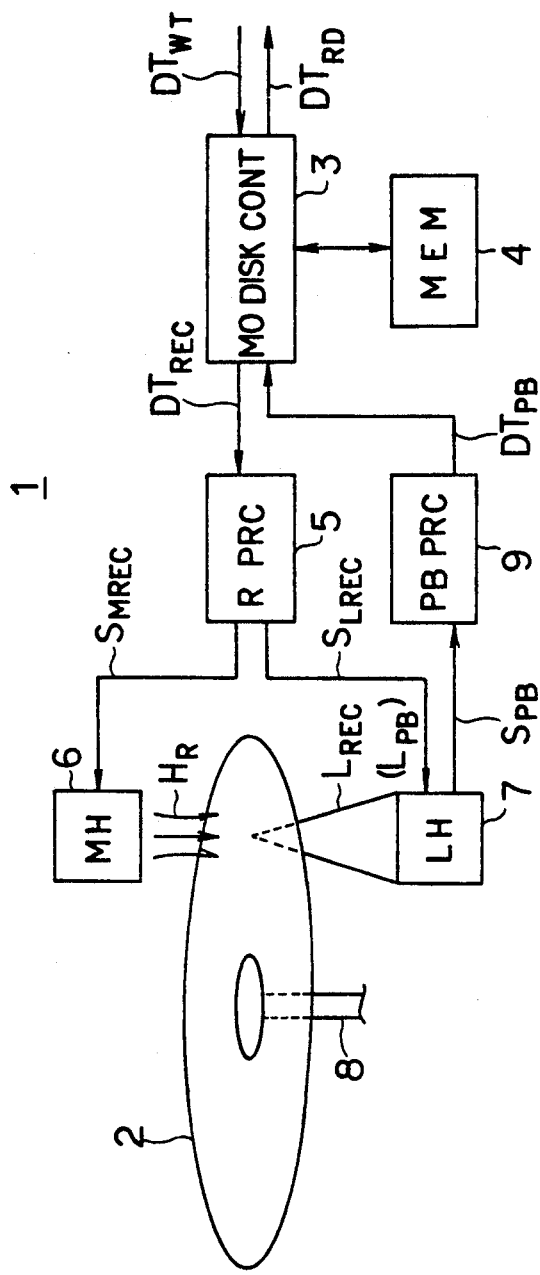
FIG. 1 is block diagram representing one embodiment of a magneto-optical disk device using an optical disk according to the present invention.

Preferred embodiments of this invention will be described with reference to the accompanying drawings:

In FIG. 1, a reference numeral 1 denotes a magneto-optical disk device as a whole using a magneto-optical disk (MO disk) 2 according to the present invention. The magneto-optical disk 2 is rotated by the drive-shaft 8. Information data in response to write data $DT_{WT}$ fed into the disk device 1 together with a write instruction from a host computer (not shown), is written on the MO disk 2. Information data read out of the MO disk 2 is sent to the host computer as read data $DT_{RD}$ in response to a read instruction inputted from the host computer.

When the information data is written on the MO disk 2, the magneto-optical disk control circuit 3 first writes the write instruction and the write data $DT_{WT}$ in a memory circuit 4. The magneto-optical disk control circuit 3 employs a microcomputer.

The magneto-optic disk control circuit 3 arranges the write data $DT_{WT}$ written in the memory circuit 4 in blocks, each block comprising, for example, 1024 bytes (or 512 bytes) and adds predetermined additional information thereto to form recording information data $DT_{REC}$. The magneto-optical disc control circuit 3 then sends the recording information data $DT_{REC}$ to a recording processing circuit 5.

The recording processing circuit 5 modulates the received recording information data $DT_{REC}$ to generate a magnetic recording drive signal $S_{MREC}$ and a light recording drive signal $S_{LREC}$, and sends them to a magnetic head 6 and a light head 7 respectively.

The magnetic head 6 applies a recording magnetic field $H_R$ in response to the magnetic recording drive signal $S_{MREC}$ to the surface of one side of the MO disk 2. The light head 7 irradiates the surface of the other side of the magnetic-optical disk 2 with a recording laser beam $L_{REC}$ in response to the light recording drive signal $S_{LREC}$. Thus, information data according to the write data $DT_{WT}$ is written on the MO disk 2.

When reading information data off the MO disk 2, the read instruction is input to the magneto-optical disk control circuit 3. The magneto-optical disk control circuit 3 drives the light head 7 to emit a light according to the read instruction, and a reproducing laser beam $L_{PB}$ illuminates the MO disk 2 at a predetermined position.

As a result, the light head 7 receives reflected light from the MO disk 7, and generates a reproduced signal $S_{PB}$ which it sends to a reproduce processing circuit 9.

The reproduce processing circuit 9 generates reproduced information data $DT_{PB}$ by binary-coding and demodulating the reproduced signal $S_{PB}$, and sends it to the magneto-optical disk control circuit 3, which writes it in the memory circuit 4.

The magneto-optical disk control circuit 3 executes, for example, an error detection and correction process on the reproduced information data $DT_{PB}$ written in the memory circuit 4, blocks it at the same time to form the reproduced information data $DT_{RD}$, and sends it to the host computer.

Thus information data is read off the MO disk 2 in response to the read instruction.

In the preferred embodiment, the MO disk 2 comprises a 5-inch disk having a format proposed, for example, in ISO/IEC DIS 10089 (International Organization for Standardization/International Electrotechnical Commission Draft International Standard 10089).

In this embodiment, the MO disk 2 has a helical recording track in which, as shown in FIG. 2, an inner periphery area $AR_{IN}$ is formed in a zone from 27 to 30 mm radius in the direction r from the center of the disc. The user recording area $AR_{USE}$ is formed in a zone from 30 to 60 m radius from the center. An outer periphery area $AR_{OUT}$ is formed in a zone from 60 to 61 mm radius from the center.

In practice, as shown in FIG. 3, a mirror zone RZ is formed in an area from 27.00 to 29.00 mm radius, and the phase-encoded part (PEP) of the control track zone CTZ with low frequency phase-encoded information recorded therein is formed in a zone from 29.00 to 29.50 mm radius in the inner periphery area $AR_{IN}$.

The phase-encoded information comprises rotation control information for the optical disk, and data relating to the modulation system, species of the disk and so forth, this information being recorded in embossed pits.

A transition zone TZ is formed in an area from 29.50 to 29.52 mm radius between the outer periphery of the PEP part of the control track zone CTZ, and the inner standard formatted part (SFP) of the control track zone ICTZ which has standard format information recorded therein and is formed in a zone from 29.52 to 29.70 mm radius.

The SFP part of the control track zone CTZ repeats the information in the PEP part of the control track zone and additionally includes information relating to the medium of the optical disk, and information indicating the wavelength, power, and pulse width of the recording and reproducing laser beams. This information is recorded in embossed pits in the same format as is used in the user area $AR_{USE}$.

A zone from 29.70 to 30.00 mm radius on the outer periphery of the inner SFP control track zone ICTZ is defined as the inner manufacturer use zone IMZ. This zone comprises the manufacturer test zone MTZ from 29.80 to 29.90 mm radius located between first and second guard bands GB1 and GB2 from 29.70 to 29.80 mm radius and from 29.90 to 30.00 mm radius.

In the outer periphery area $AR_{OUT}$, a zone from 60.00 to 60.15 mm radius is defined as the outer manufacturer use zone OMZ, an outer SFP control track zone OCTZ is formed in a zone from 60.15 to 60.50 mm radius, and a zone from 60.50 to 61.00 mm radius is used as a lead-out zone LOZ.

Normally, a value "0001 0000" indicating a WORM disk or a value "0010 0000" indicating a rewritable MO disk is set as the data indicating the species of the disk for 1 byte of PEP information in the PEP part of the control track zone CTZ. However, since the MO disk 2 is used as a postscript-type optical disk in this embodiment, a value "0001 0001", for example, is set. Also, the corresponding SFP information in the inner SFP control track zone ICTZ and in the outer SFP control track zone OCTZ is similarly modified and so set.

The user recording area $AR_{USE}$ includes 18,751 tracks, such as the track $T_1$ shown in FIG. 2A, each 1.6 μm wide. When one sector such as the sector S, also shown in FIG. 2A, includes 1,024 bytes (or 512 bytes), 17 sectors (or 31 sectors) are formed on each track, and 318,767 sectors (or 581,281 sectors) are formed in the user recording area $AR_{USE}$.

Figure 4:
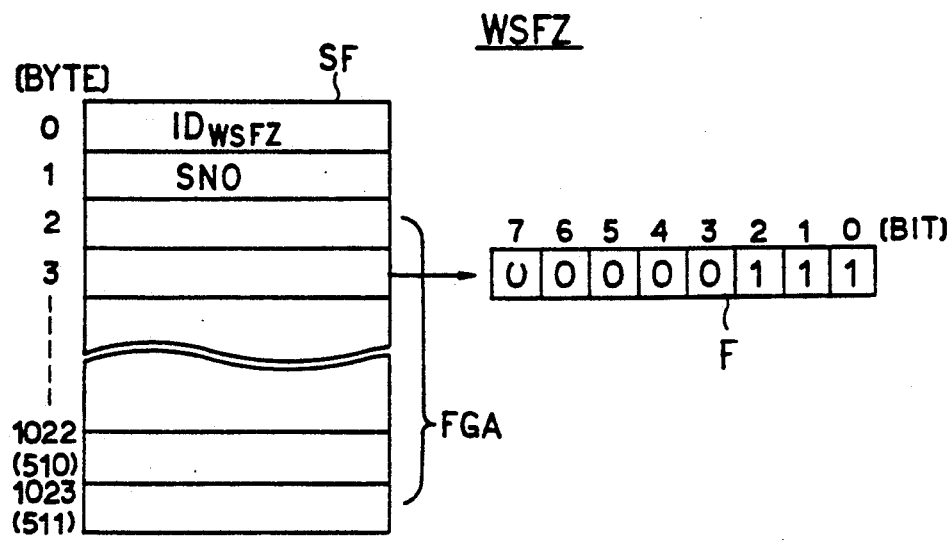
FIG. 4 is a schematic diagram showing the format of the written sector flag zone.

In the MO disk 2 of this embodiment, the written sector flag zone WSFZ, in which there are written sector flags indicating whether or not sectors of the user recording area $AR_{USE}$ are used (written), is located in the second guard band GB2 of the inner manufacturer use zone IMZ, as shown in FIG. 3. The written sector flag zone comprises a plurality of 1-bit written sector flags, such as the written sector flag F, shown in FIG. 4.

Where each sector on the disk has 1,024 bytes, and there are a total of 318,767 sectors in the user recording area $AR_{USE}$, and hence there are 318,767 written sector flags, 39 sectors (3 tracks) are required for the written sector flag zone WSFZ, as will be obtained from the following equation and FIG. 4:

$$\frac{318767/(8 * 1024)}{17} = 38.91 \text{ sectors} \quad (1)$$
$$= 2.28 \text{ tracks}$$

The written sector flag zone occupies from the 0th sector of the $-3$rd track to the 16th sector of the $-1$st track.

Where each sector has 512 bytes, there are a total of 581,281 sectors in the user recording area $AR_{USE}$, the written sector flag zone occupies 142 sectors (5 tracks), as will be obtained from the following equation:

$$\frac{581,281/(8 * 512)}{31} = 141.91 \text{ sectors} \quad (2)$$
$$= 4.58 \text{ tracks}$$

The written sector flag zone occupies from the 0th sector of the $-5$th track to the 30th sector of the $-1$st track.

In practice, as shown in FIG. 4, when the written sector flag zone WSFZ has 39 sectors (or 142 sectors), in each sector, a written sector flag zone identifier $ID_{WSFZ}$ comprising, for example, the hexadecimal value $(01)_H$ is written in the 1st byte 0, the sector number SNO comprising values 0 to 38 (or 141) is written in the 2nd byte 1 following the first byte, and the bytes from the 3rd byte 2, following the second byte, to the 1024th byte 1023 (or the 512th byte 511) are used as the flag area FGA.

Written sector flags, such as the written sector flag F, indicating whether or not each of the 8 sectors from the Nth sector to the (N+7)th sector of the user recording area $AR_{USE}$ are used are set in a value "1" or "0" in those bits from the 1st bit 0 (or LSB) to the 8th bit 7 (or MSB) of bytes following the second byte in each sector of the flag area FGA.

Additionally, a strong error detection correction code is applied to the written sector flag zone WSFZ to prevent errors from arising due to drop-outs and the like.

Figure 5:
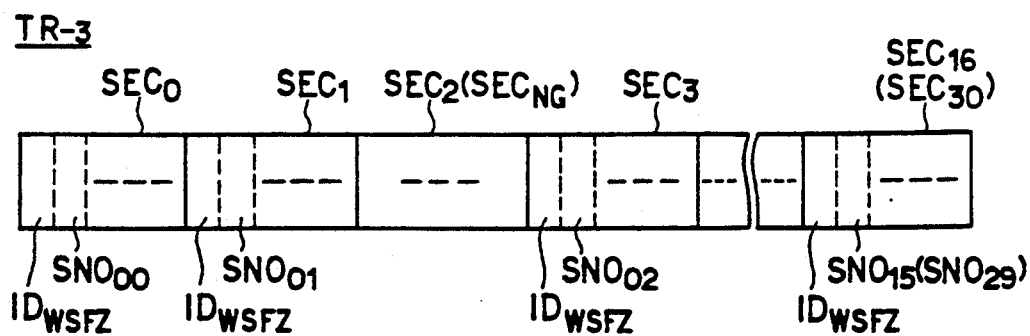
FIG. 5 is a schematic diagram illustrating the alternation process carried out at the time when the written sector flag zone is generated.

Further, in the magneto-optical disk device 1 of the embodiment, as shown in FIG. 5, the values "1", "2" and "3" are set as the sector number SNO to, for example, the 1st sector $SEC_0$ of the $-3$rd track $TR_{-3}$, the 2nd sector $SEC_1$, and the 3rd sector $SEC_2$ in that order. When a write error is detected on the 3rd sector $SEC_2$, the 3rd sector $SEC_2$ is subjected to an alternation process as a result of its being a no-good (N.G.) sector $SEC_{NG}$.

Because the 3rd sector $SEC_2$ is identified as a N.G. sector $SEC_{NG}$, this sector is ignored as a result of the alternation process. Consequently, the value "3" is written as the sector number SNO in the 4th sector $SEC_3$ following the third sector. The rest of the written sector flag zone WSFZ is then provided by means of sectors $SEC_3$ to $SEC_{16}$ in order.

In practice, when each sector has 1,024 bytes, 3 tracks or 51 sectors are reserved for the written sector flag zone WSFZ, which provides a reserve of 12 sectors in addition to the 39 sectors that are necessary according to Eq. (1).

Enough sectors are reserved to accommodate the 2 bytes per sector required for the written sector flag zone identifier $ID_{WSFZ}$ and the sector number SNO, to allow error detection and correction codes to be used, and to accommodate any alternation process required.

When each sector has 512 bytes, 5 tracks or 155 sectors are reserved, which provides 13 extra sectors in addition to the 142 sectors that are necessary according to Eq. (2).

Accordingly, enough sectors are reserved, as in the case where each sector has 1,024 bytes, and thus the alternation process can likewise be carried out when necessary.

In the above-mentioned embodiment, for example, all the written sector flags of the written sector flag zone WSFZ of the MO disk 2 are set to the value "0" at the time of shipment.

In the magneto-optical disk control circuit 3 of the optical disk device 1, to write desired information data in the user recording area $AR_{USE}$ of the MO disk 2, the contents of the written sector flag zone WSFZ are read first into the memory circuit 4 before the information data is written.

Subsequently, the contents of the written sector flag zone WSFZ in the memory circuit 4 are searched to detect an empty sector, i.e., a sector having a written sector flag with the value "0", and the desired information data is written in the empty sector.

The magneto-optical disk control circuit 3 then sets the written sector flag in the written sector flag zone WSFZ on the MO disk 2 corresponding to the sector in which the information data was written to the value "1".

In the magneto-optical disk device 1, the arrangement is such that rewriting or overwriting cannot be allowed in a sector that has a written sector flag in the written sector flag zone WSFZ set to the value "1".

According to the above-mentioned embodiment, an optical disk capable of detecting easily whether or not each sector of the user recording area $AR_{USE}$ has been used can be realized by referring to the written sector flag zone WSFZ, in which there is a plurality of flags for indicating whether or not each sector of the user recording area $AR_{USE}$ has been used.

Further, according to the above-described embodiment, an alternation process is applied to the written sector flag zone WSFZ, which enables whether or not each sector of the user recording area $AR_{USE}$ has been used to be determined with certainty.

Thus, the written sector flag zone WSFZ is provided on the MO disk to prevent rewriting and overwriting in sectors that are already written, which enhances the utility of using the MO disk as a postscript-type optical disk.

In the aforementioned embodiment, the written sector flag zone is formed in a part of the inner periphery area of the disk, outside the user recording area. However, the written sector flag zone is not necessarily limited to this area and similar results may be obtained in the written sector flag zone is formed at a predetermined position in the user recording area, but radially separated from the parts of the user area in which the desired user data is stored.

Further, in the aforementioned embodiment, the description has referred a 5-inch format MO disk, however, a 3-inch format or other types of MO disk may be used.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A rewritable optical disk wherein information data is writable to and readable from a user recording area, the use recording area having a plurality of sectors, the disk comprising:
   a written sector flag zone, radially separated from the user recording area, and
   a plurality of written sector flag means in the written sector flag zone, each written sector flag means corresponding to a sector in the user recording area, and
   indicating whether information data has been written in the sector.

2. A rewritable optical disk according to claim 1, wherein
   the written sector flag means consists of 1 bit, and
   the written sector flag zone has a writing capacity of more than N bits, N being the total number of sectors in the user recording area.

3. A rewritable optical disk according to claim 2, wherein written sector flag means are written in the written sector flag zone using error correction.

4. A rewritable optical disk according to claim 1, wherein
   the written sector flag means in the written sector flag zone are written in a plurality of sectors,
   the written sector flag zone includes a no-good sector and a first good sector following the no-good sector, and
   the written sector flag means not written in the no-good sector are written in the first good sector.

5. In combination, a rewritable optical disk and apparatus for writing and reading the optical disk, wherein
   information data is writable to and readable from a user recording area of the disk, the user recording area having a plurality of sectors, the disc having a written sector flag zone, radially separated from the user recording area, and a plurality of written sector flag means each written sector flag means corresponding to a sector in the user recording area, and indicating whether information data has been written in the sector, and
   the reading and writing apparatus comprises:
     a reading means for reading the written sector flag means in the written sector flag zone,
     a write inhibiting means, receiving written sector flag data corresponding to the written sector flag means read by the reading means, for inhibiting writing information data in the sector in the user recording area corresponding to a written sector flag means that the written sector flag data indicates as having information data written in it,
     a writing means, responsive to the write inhibiting means, for writing information data in a sector in the user information area, the sector being a sector in which writing is not inhibited, and
     a flag setting means for setting a written sector flag means in the written sector flag zone, the written sector flag means corresponding to the sector in the user recording area in which the writing means has written information data.

6. A rewritable optical disk wherein information data is writable to and readable from a user recording area, the user recording area having a plurality of sectors, the disk comprising:
   a written sector flag zone, radially separated from the user recording area, and
   in the written sector flag zone, a written sector flag means corresponding to each sector in the user recording area for indicating whether information data has been written in the sector.

7. A rewritable optical disk according to claim 6, wherein
   the written sector flag means consists of 1 bit, and
   the written sector flag zone has a writing capacity of more than N bits, N being the total number of sectors in the user recording area.

8. A rewritable optical disk according to claim 7, wherein written sector flag means are written in the written sector flag zone using error correction.

9. A rewritable optical disk according to claim 6, wherein
   the written sector flag means in the written sector flag zone are written in a plurality of sectors,
   the written sector flag zone includes a no-good sector and a first good sector following the no-good sector, and
   the written sector flag means not written in the no-good sector are written in the first good sector.

10. In combination, the rewritable optical disk of claim 6 and an apparatus for writing and reading the optical disk, wherein the writing and reading apparatus comprises:
    a reading means for reading the written sector flag means in the written sector flag zone,
    a write inhibiting means, receiving written sector flag data corresponding to the written sector flag means read by the reading means, for inhibiting writing information data in the sector in the user recording area corresponding to a written sector flag means that the written sector flag data indicates as having information data written in it,
    a writing means, responsive to the write inhibiting means, for writing information data in a sector in the user information area, the sector being a sector in which writing is not inhibited, and
    a flag setting means for setting a written sector flag means in the written sector flag zone, the written sector flag means corresponding to the sector in the user recording area in which the writing means has written information data.

* * * * *